US011922730B2

(12) United States Patent
Levin et al.

(10) Patent No.: US 11,922,730 B2
(45) Date of Patent: Mar. 5, 2024

(54) METHODS FOR SIGNATURE VERIFICATION AND AUTHENTICATION

(71) Applicants: Simon Levin, Atlantic Beach, FL (US); Robert Davidoff, Southlake, TX (US)

(72) Inventors: Simon Levin, Atlantic Beach, FL (US); Robert Davidoff, Southlake, TX (US)

( * ) Notice: Subject to any disclaimer, the term of this patent is extended or adjusted under 35 U.S.C. 154(b) by 0 days.

(21) Appl. No.: 17/467,180

(22) Filed: Sep. 4, 2021

(65) Prior Publication Data

US 2023/0071377 A1 Mar. 9, 2023

(51) Int. Cl.
*G06K 9/00* (2022.01)
*G06F 16/23* (2019.01)
(Continued)

(52) U.S. Cl.
CPC .......... *G06V 40/33* (2022.01); *G06F 16/2379* (2019.01); *G06F 21/32* (2013.01); *G06V 30/418* (2022.01)

(58) Field of Classification Search
CPC ........ G03H 2001/0016; G03H 2222/15; G06F 21/31; G06F 21/36; G06F 21/64; G06F 3/04883; G06F 40/169; G06F 40/171; G06F 40/174; G06F 21/32; G06F 21/83; G06F 3/03545; G06K 19/16; G06K 7/12; G06K 9/00; G06K 9/00006; G06K 9/00174;
(Continued)

(56) References Cited

U.S. PATENT DOCUMENTS 7,188,246 B2 3/2007 Arling et al.
10,439,821 B2 10/2019 Riley
(Continued)

FOREIGN PATENT DOCUMENTS

CN 201120465806 11/2011
WO WO-2016039883 A1 * 3/2016 ......... G06K 9/00154

OTHER PUBLICATIONS

J. Ortega-Garcia, J. Bigun, D. Reynolds and J. Gonzalez-Rodriguez, "Authentication gets personal with biometrics," in IEEE Signal Processing Magazine, vol. 21, No. 2, pp. 50-62, Mar. 2004, doi: 10.1109/MSP.2004.1276113. (Year: 2004).*
(Continued)

*Primary Examiner* — Michael J Vanchy, Jr.

(57) ABSTRACT

The present disclosure provides for methods for signature and identity verification and authentication. The system may comprise a plurality of visual capture devices, virtual data, and a plurality of virtual databases. The plurality of visual capture devices may capture a photo or video of the signee, the signature, a witness, or a combination thereof. The system may comprise a plurality of auxiliary authentication components for recording data such as the date, time, and location of the signature verification, as non-limiting examples. The virtual data may comprise visual data and other metadata. The method may comprise uploading the virtual data collected during the signature verification to a blockchain, where a signature authentication may occur or be recorded. Auxiliary authentication devices may include a plurality of audio capture devices, a plurality of geospatial capture devices, such as accelerometers or GPS, a plurality of pressure sensors, or any combination thereof, as non-limiting examples.

10 Claims, 12 Drawing Sheets

(51) Int. Cl.
  *G06F 21/32* (2013.01)
  *G06V 30/418* (2022.01)
  *G06V 40/30* (2022.01)
(58) Field of Classification Search
  CPC ........... G06K 9/00221; G06K 9/00402; G06K 9/00885; G07C 9/24; G07C 9/25; G07F 7/086; H04L 63/107; Y10S 283/901; G06Q 20/4014; G06Q 20/40145; G06V 40/12; G06V 40/13; G06V 40/30
  See application file for complete search history.

(56) References Cited

U.S. PATENT DOCUMENTS

| | | | | |
|---|---|---|---|---|
| 2002/0025062 | A1* | 2/2002 | Black | G07C 9/37 382/116 |
| 2006/0047963 | A1* | 3/2006 | Brown | H04L 9/3247 713/176 |
| 2009/0175491 | A1* | 7/2009 | Charpentier | G06K 9/00885 382/100 |
| 2010/0275044 | A1* | 10/2010 | Balakrishnan | G06F 12/0864 713/320 |
| 2012/0117467 | A1* | 5/2012 | Maloney | G06Q 50/18 715/273 |
| 2012/0230577 | A1* | 9/2012 | Calman | G06Q 20/0425 382/138 |
| 2013/0024922 | A1* | 1/2013 | Rodriguez | H04L 63/083 726/6 |
| 2015/0078665 | A1* | 3/2015 | Wang | G06F 21/32 382/187 |
| 2017/0024576 | A1* | 1/2017 | Kinsel | G06V 30/414 |
| 2018/0107818 | A1* | 4/2018 | Wu | G06F 21/64 |
| 2018/0253539 | A1* | 9/2018 | Minter | H04W 12/069 |
| 2020/0258176 | A1* | 8/2020 | Gibson | G06Q 10/083 |

OTHER PUBLICATIONS https://www.signnow.com/features/signature-with-finger; airSlate Inc.
https://helpx.adobe.com/acrobat/using/capture-and-sync-your-signature.html; Adobe Inc.

* cited by examiner

METHODS FOR SIGNATURE VERIFICATION AND AUTHENTICATION

BACKGROUND

Since there is no way to verify whether someone is who they say they are online, establishing authenticity is central to virtually every digital or online interaction. In the current digital age, it is not just enough to be "authentic" as an individual or company—there is a well-established need for a third party to also verify a person's or object's authenticity. As such, most news outlets and responsible social media platforms go to great lengths to ensure the content they produce, promote, or circulate is "verified" or "fact-checked."

On social media accounts, celebrity, government-entity, university, and other high-profile webpages are often "verified," usually denoted by a check-mark icon. This check-mark guarantees platform users that they are interacting with the actual person or people behind the name, brand, or entity. On the digital security side, online banking systems, universities, healthcare providers, insurance providers, and others have turned to two-factor authentication to ensure that the people accessing various accounts, portals, or interfaces are the actual people who are supposed to be doing so.

One particular category that often requires authentication and verification is signatures. Signatures are often required to cash a check; buy property, such as a house or apartment; obtain a driver's, professional, or marriage license; take out a loan; pay bills or pay off a credit; opt into a contract; accept a job; and create a will. Though universal, signatures are often unique to an individual.

Regardless of the document or article they are affixed to, signatures identify the signee. For example, celebrities, such as movie stars or Olympic athletes, often sign their names on memorabilia throughout their career to give or sell to fans. The more famous the signee, the higher the price these signed objects can sell for in the marketplace. Some fans may be willing to pay thousands of dollars for a signed object from their favorite celebrity. However, bad actors such as scam artists have noticed this willingness to pay for much-wanted items and have definitely taken advantage of this market.

Although signature forgery is a centuries-old problem, in the modern era there are severe implications. Technology has also opened the door to hackers, forgers, and other bad actors to take advantage of vulnerable people and processes. For a skilled forger, it is much easier now to forge a signature and either use it to hack someone else's bank or other personal accounts, or affix a forged signature to a fake item and pawn it off as belonging to a celebrity.

As a result, solutions to verify and authenticate signatures have been created, though none include automatic authentication and verification in real-time using visual capture devices, such as a camera, to capture the moment of the signature. For example, many websites and other digital applications utilize two-factor authentication, usually through a third-party mobile application. These processes are not automatic—they usually require a text message to be sent to a mobile device or a phone call. Furthermore, there are no current solutions to capturing evidence of a person signing an object without having a witness present to verify the occurrence.

SUMMARY OF THE DISCLOSURE

What is needed is an automatic method for signature verification and authentication in real-time. This method provides a solution for signature verification and authentication while having the same authenticity of signing in person. Additionally, the disclosed method may allow for automatic verification and authentication of a signature virtually. In some embodiments the associated time and cost of verifying and authenticating a signable object may be reduced by storing the data in a database. The uncertainty of signature verification and authentication may be resolved through the disclosed method of using multiple visual capture devices, data, and databases, or any combination thereof.

The present disclosure provides generally for a method for signature verification and authentication. The method may collect data of the signee and metadata when a signature is produced on a signable object. The data collected may comprise of a signee's signature and picture wherein this visual data may be used to verify and authenticate when a signature event occurs. In some implementations this data may be collected with a visual capture device. Visual data may be stored on a virtual database with metadata collected from an external device. The virtual database may comprise one or more decentralized or centralized digital ledgers, a hierarchical database, or a relational database, as non-limiting examples.

Further, the present disclosure provides for a method that may allow a signable object to be authenticated through data stored on the virtual database. In some embodiments, the authentication may be based on data that is immutable to confirm that the signable object may be authentic.

The present disclosure relates to a system for signature verification. In some implementations, the system may include a signable object, configured to be signed by a signee; at least one visual capture device, where the at least one visual capture device may be configured to document the signature of the signee on the signable object; at least one auxiliary authentication mechanism where the at least one auxiliary authentication provides secondary documentation of signing the signable object; virtual data may comprise information received from the at least one visual capture device, where the virtual data further may comprise a plurality of metadata, where the metadata may comprise information received from the at least one auxiliary authentication mechanism; and a virtual database configured to record the virtual data.

In some aspects, the signable object may comprise a tangible or digital form, file, or piece that can be affixed with the signee's signature. In some embodiments, the signable object may comprise a tangible or digital item that may be transferable from the signee to a third-party. In some implementations, the plurality of visual capture devices may interface with a virtual application. In some aspects, the visual capture device may interface with the virtual database via the virtual application to upload the virtual data.

In some embodiments, the at least one visual capture device may interface with the virtual database via the virtual application to retrieve the virtual data. In some implementations, the at least one visual capture device may comprise one or more of a camera, a plurality of cameras, a smartphone may comprise a plurality of cameras, a laptop may comprise a plurality of cameras, or a tablet may comprise a plurality of cameras. In some aspects, the at least one visual capture device further may comprise one or more of a wi-fi transmitter, a Bluetooth transmitter, RFID transmission, or a GPS transmitter.

In some embodiments, the at least one visual capture device may digitize the signable object. In some implementations, the metadata may be derived from one or more of a calendar, a clock, a coordinate system, an accelerometer, a GPS, or pressure sensor. In some aspects, the metadata may comprise two or more of visual data, audio data, geospatial data, a date and timestamp, or an IP address. In some embodiments, the virtual database may comprise a virtual ledger. Implementations of the described techniques may comprise hardware, a method or process, or computer software on a computer-accessible medium.

The present disclosure relates to a method for signature verification. In some aspects, the method may include activating a visual capture device; capturing real-time visual documentation of the signature verification through the visual capture device, recording metadata associated with the real-time visual documentation, storing real-time visual documentation and metadata in blockchain, concatenating metadata and visual documentation, and providing verification of signature occurrence.

In some embodiments, the signature verification may comprise auxiliary authentication. In some implementations, the metadata may comprise information received from auxiliary authentication. In some aspects, capturing real-time visual documentation of the signature may comprise video of the signature. In some embodiments, the method may comprise relaying a live transmission of the signature. In some implementations, the metadata may comprise a plurality of unit measurements may comprise one or more of a multi-axis acceleration, an applied force, and a time elapsed during the signature. In some aspects, the concatenation may combine the plurality of unit measurements.

In some embodiments, the method may include receiving signee information, where signee information may comprise at least a name; verifying signee information, where verifying compares signee information to at least a first verifying document; visually capturing signing of a signable object by signee; authenticating a signature in real time based on comparing captured visual data to at least the first verifying document; accessing metadata associated with signing of the signable object; and securely storing at least captured visual data, authentication, and metadata on an immutable database.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

Figure 1:
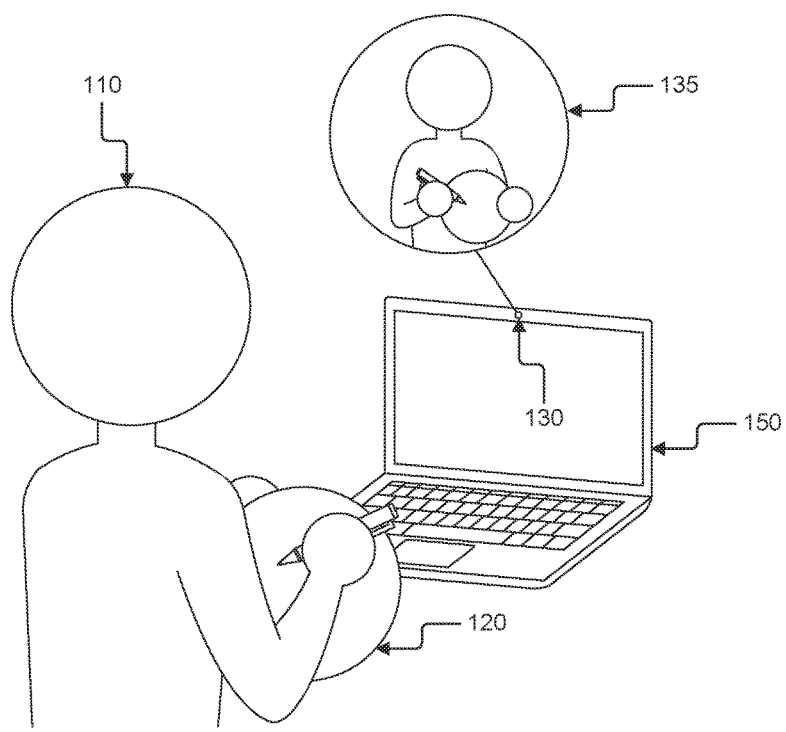
FIG. 1 illustrates an exemplary signature verification, according to some embodiments of the present disclosure.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Verification: as used herein describes the action of confirming the origin of a signature. Verification may require proving an authenticated connection of a signature to a signee through supplementary metadata, such as a date and timestamp, IP address, or other geospatial data. In some embodiments, verification may occur automatically through a virtual application that may interface with an external device comprising a plurality of metadata capture devices, including a plurality of visual capture devices, such as a smartphone, tablet, laptop, or desktop computer, as non-limiting examples. The verification process may require submitting, storing, and later retrieving data from an immutable virtual database or ledger, such as a blockchain. The fidelity of the signature verification may improve as two or more pieces of metadata are concatenated to increase the certainty of the signature occurring as asserted.

Authentication: as used herein describes the action of connecting a signature to a signee. Authentication may require collecting visual data of a signee producing a signature in real-time. Authentication may occur automatically through a virtual application that may interface with an external device comprising a plurality of metadata capture devices, including a plurality of visual capture devices, such as a smartphone, tablet, laptop, or desktop computer, as non-limiting examples.

Signee: as used herein describes a person whose signature is being verified and authenticated.

Signable Object: as used herein describes an entity that embodies a person's signature. The signable object may comprise, but is not limited to, a printed or digital document, file, form, or paper; a tangible or digital piece of memorabilia, such as a coveted piece of merchandise; a business, financial, or transactional document, such as an order confirmation, receipt, or refund; an agreement such as a rental agreement, car lease, loan agreement, or any kind of written contract, tangible or digitized; an issued license, official form, or other kind of government documentation requiring notarization; or any other actual or digitized article that may be fixed with a person's signature. For example, digital signable objects may come in a variety of forms such as .DOC, .DOCX, PDF, .PNG, .JPG, .JPEG, or any kind of non-fungible token (NFT), as non-limiting examples.

Metadata: as used herein describes any information that may be collected during the signature verification and authentication. In some embodiments, metadata may comprise the geographical location of the device, date, and time of when the data is recorded, as non-limiting examples. In some implementations, metadata may comprise any type of recording, such as a visual or an audio recording, and any relevant or implicit associated data, such as exchangeable image file format data (EXIF data). For example, when the signature verification and authentication process interfaces with a virtual or desktop application, the metadata may comprise the information about the user, such as name, age, gender, or other non-limiting examples; the user's login data; the IP address of the device accessing the application; and other non-limiting equivalents.

Blockchain: as used herein refers to any virtual database or ledger. In some embodiments, the blockchain may be decentralized. In some implementations, the blockchain may comprise an associative database.

The present disclosure describes a method for signature verification and authentication. In some embodiments, the signature verification may comprise a signee. In some implementations, the signature verification may comprise an external device that may comprise a plurality of transmitters and a plurality of visual data capture devices. In some aspects, the signature verification may be stored within a virtual application that may be downloaded and used on a pre-existing external device such as a phone, tablet, or laptop, as non-limiting examples.

As an example, the method for signature verification and authentication may comprise a signee, a signature, an external device, a plurality of visual data capture devices, such as a plurality of cameras, and a plurality of metadata capture devices, such as a microphone or geospatial data capture devices. In some implementations, the method for signature verification and authentication may replace the need to consult a third party for signature verification during or after the signature. The method for signature verification may occur automatically in real-time and may create visual data and other relevant metadata to be stored for later reference.

Referring now to FIG. 1, an exemplary signature verification 100 is illustrated. In some embodiments, the signature verification 100 may comprise a signee 110. In some implementations, the signature verification 100 may comprise a signable object 120. In some aspects, the signable object 120 may comprise a tangible form, document, paper, or piece of merchandise, or a digitized file or non-fungible token (NFT). In some embodiments, the signature verification 100 may comprise a plurality of visual capture devices 130, such as a camera, as a non-limiting example.

In some implementations, the signature verification 100 may comprise an external device 150. In some aspects, the signature verification 100 may comprise visual capture devices 130 uploaded to the blockchain, as a non-limiting example. In some embodiments, the signature verification 100 may take place in real-time via automatic collection of visual capture devices 130 and other metadata, such as geospatial data, at the time of the signature.

In some aspects, the signature verification 100 may occur before, during, or after the signee 110 signs the signable object 120. For example, the signature verification 100 may occur in real. In some implementations, the signee 110 may have to log in to access the signature verification. In some aspects, the signee 110 may log in to access the signature verification 100, wherein they may provide personal information or access an existing account to access the signature verification 100.

In some aspects, the signee 110 may have to provide a driver's license, identification card, or other document, form, or proof to authenticate their signature. In some embodiments, this validating piece of identification may be uploaded to the smartphone or desktop application prior to the signature or verified in real-time during the signature. In some implementations, this authentication may be used to authenticate the identity of the signee 110 in real-time during their signing of the signable object 120.

In some embodiments, providing personal information or accessing an existing account to access the signature verification 100 may automatically engage the visual capture device 130 of the external device 150. In some implementations, the external device 150 may comprise a smartphone, a laptop, or other electronic device capable of running the signature verification 100.

In some aspects, the visual capture device 130 may record visual data 135 of the signee 110 signing the signable object 120, the signature affixed on the signable object 120, or some combination thereof. In some embodiments, the visual capture device 130 recording visual data 135 of the signature may capture the signature in real-time, creating data that may later be stored and retrieved for signature verification 100. In some implementations, signature verification 100 may be required in a variety of situations, such as in the appraisal of signable objects 120 or authentication of a person's signature. In some embodiments, the signature verification 100 may gather geospatial data, such as the date, time, location of the signature, and capture of the visual data 135 by the visual capture device 130, as non-limiting examples.

In some aspects, the visual data 135 and any related geospatial data may be recorded by the signature verification 100, whereby this virtual data 135 may be added to a blockchain. For example, the smartphone or desktop application may upload the virtual data to the blockchain. The virtual data may be stored in a decentralized array while in the blockchain and may provide a higher level of virtual data authentication as a result of the immutable nature of blockchain.

In some embodiments, the virtual data 135 may use methods of concatenation to increase the fidelity of the signature verification 100. The concatenation may associate multiple portions of virtual data 135 through common variables such as a time, location, or IP address, as non-limiting examples.

In some embodiments, the signature verification 100 may utilize delayed retrieval of archived virtual data 135 for signature verification 100. In some implementations, collecting and saving visual data 135 and other metadata using this methodology may enable purchasers of signed memorabilia, government bodies, creditors and bankers, and any other interested party the ability to authenticate and verify a signee's 110 signature.

Figure 2:
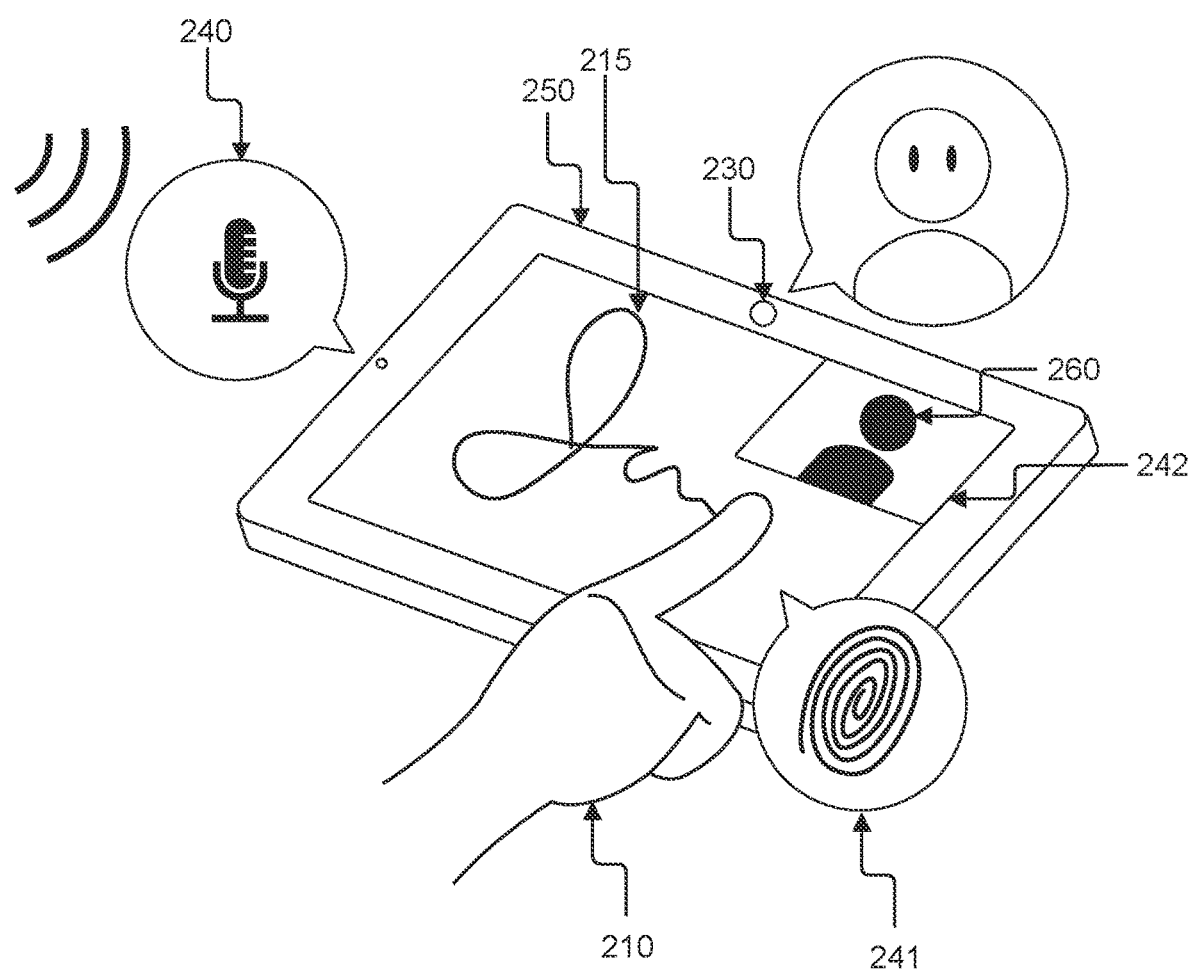
FIG. 2 illustrates an exemplary signature verification comprising one or more auxiliary authentications, according to some embodiments of the present disclosure.

Referring now to FIG. 2, an exemplary signature verification 200 comprising one or more auxiliary authentications 240, 241, 242 is illustrated. In some embodiments, the signature verification 200 may occur on an external device 250, such as a tablet, with a plurality of auxiliary authentications 240, 241, 242 that may utilize metadata capture components, such as a visual capture device 230 and a microphone.

In some implementations, the external device 250 may interface with a virtual application the signee 210 may use to provide a signature 215 on a digital signable object, such as a digitized form, file, or other non-limiting NFT. The integration of the signature authentication 100 with a virtual application may allow the signature authentication 200 to be used on pre-existing devices. In some embodiments, the application may provide more portability to the signature authentication 200.

In some aspects, the signee 210 may automatically activate the visual capture device 230, such as a camera, to record the signee 210 signing the signable object. In some embodiments, this visual data may be uploaded to the blockchain, for immutable storage. Immutable storage may protect the authentication of the virtual data by protecting the virtual data from modification and deletion. The prevent of such administrative actions may increase the fidelity of the signature verification 200 by ensuring the supporting virtual data has remained in an unedited state.

In some aspects, the signee 210 may log on to an account that may interface with the external device 250 to access the signature verification 200. After logging on, the signee 210 may upload a digital image of a signable object and proof of identification, such as a government-issued photo I.D., to the signature verification 200. In some embodiments, verification of the proof of identification may take place in real-time within the signature verification 200. This verification may occur intrinsically in the external device 250, such as through reading the signee's 210 fingerprint either through the touchscreen or utilizing a fingerprint scanner in a home button or other external device 250 fixture, as non-limiting examples. In some embodiments, this auxiliary authentication 241 may be included in the metadata. In some implementations, a witness 260 may verify the identity of the signee 210.

For example, the witness 260 may sign-on to the signature verification 200 and verify the identification of the signee 210, watch the signature 215, both, or some combination thereof. In some embodiments, the witness may require visual verification of the photo identification or audio confirmation of the signee 210 through the visual capture device 230 or an auxiliary authentication 240 such as a microphone, respectively. In some implementations, the witness 260 may verify the identification of the signee 210.

For example, the witness 260 may be present for the signature verification 200 and watch the signee 210 sign the signable object through the visual capture device 230. In some embodiments, the witness 260 may control the signature verification 200 process. In some implementations, the witness 260 may determine the forms of metadata associated with a signature verification 200. In some aspects, the witness may be required to provide authentication prior to participating in the signature verification 200 process. In some embodiments, the witness 260 and their identifying information may be stored as a form of metadata. For example, the signee 210 may hire a proctor witness 260 from a distinguished company to increase the fidelity of the signature verification 200.

In some aspects, the external device 250 may record this whole process utilizing screen recording or some other non-limiting equivalent. If the external device 250 screen records both the signature 215 and the witness 260 witnessing the signature 215, the signature verification 200 may incorporate this metadata into the final upload to the blockchain.

Figure 3:
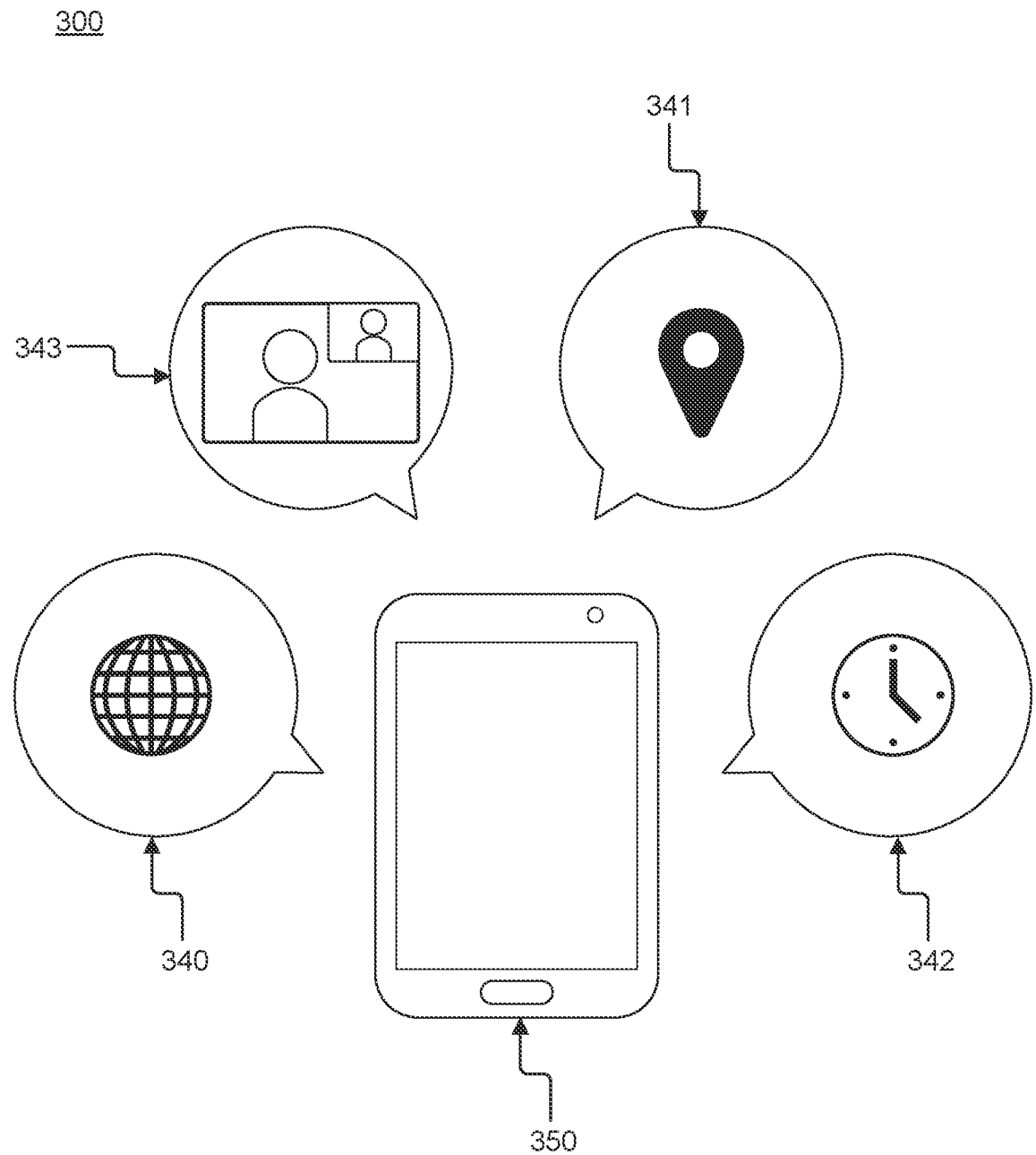
FIG. 3 illustrates an exemplary signature verification comprising one or more auxiliary authentications, according to some embodiments of the present disclosure.

Referring now to FIG. 3, an exemplary signature verification 300 comprising one or more auxiliary authentications 340, 341, 342, 343 is illustrated. For example, the auxiliary authentications 340, 341, 342, 343 may comprise geospatial data, a screen recording, a position marker, and a timestamp. In some embodiments, the auxiliary authentications 340, 341, 342, and 343 may be captured by an external device 350 that may comprise a camera, microphone, and other metadata capture components, such as a smartphone, tablet, or laptop, as non-limiting examples. Gathering and storing the auxiliary authentications 340, 341, 342, 343 may enhance the validity of the signature authentication.

For example, the immutable nature of the blockchain allows these auxiliary authentications 340, 341, 342, 343 to be permanently stored together for later reference and authentication of the signature verification 300. Immutable storage may protect the authentication of the virtual data by protecting the virtual data from modification and deletion. The prevent of such administrative actions may increase the fidelity of the signature verification 300 by ensuring the supporting virtual data has remained in an unedited state.

Figure 4:
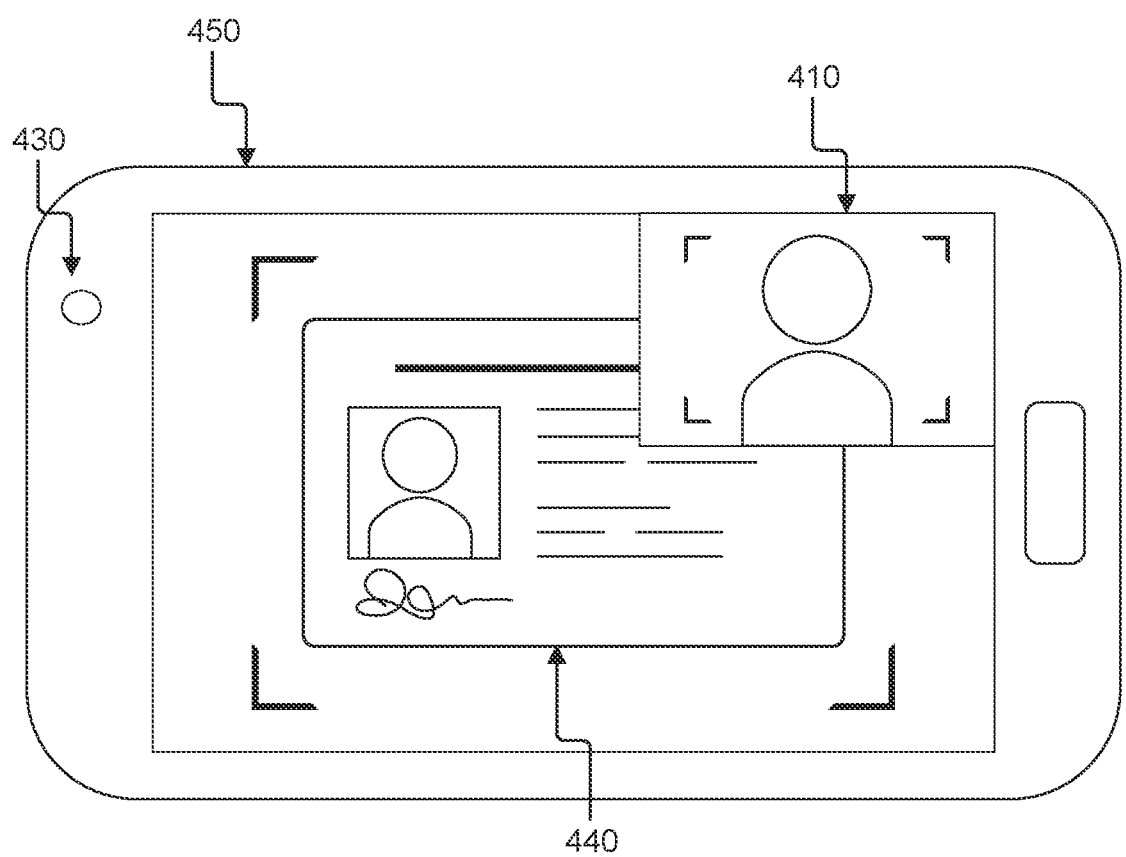
FIG. 4 illustrates an exemplary signature verification comprising auxiliary authentication and a visual capture device, according to some embodiments of the present disclosure.

Referring now to FIG. 4, an exemplary signature verification 400 comprising auxiliary authentication 440 and a visual capture device 430 located on a portable device 450 is illustrated. In some embodiments, the auxiliary authentication 440 and the visual capture device 430 may interface with one another and with an external device, such as a smartphone, laptop, or desktop computer. In some implementations, the signature verification 400 may utilize two or more visual capture devices 430 simultaneously, such as a front and rear camera on a smartphone. In some aspects, the auxiliary authentication 440 may utilize the visual capture device 430 to take a photo of a photo identification card or form, such as a driver's license. In some implementations, the signature verification 400 may store the photo of the photo identification card or form for later use and verification.

In some embodiments, the signature verification 400 may interface with two or more visual capture devices 430, such as a front and rear camera on a smartphone. For example, the signature verification 400 may select one or more of the visual capture devices 430 on a smartphone 450 based on sensing the relative locations of the signee 410, the signable object 420, or both. The visual capture devices 430 may operate simultaneously to capture visual data through all visual capture devices 430 available on the external device, such as a photo or video of the signee 410 through the front camera and a photo or video of the singable object 420 during the signature verification 400 through the rear camera.

In some aspects, the rear camera may capture a photo of the photo identification card while the front camera focuses on the signee's 410 face. In some implementations, the signature verification 400 may cross-check the signee's 410 image taken with the front camera with the image on the photo identification card taken with the rear camera simultaneously in real-time.

In some aspects, this cross-check verification may be performed by the signature verification 400, thereby allowing the signee 410 to transition to a second interface where the signature can be affixed on a signable object. Having two or more interfaces for auxiliary authentication 440 capture contributes to the accuracy of the signature verification 400 by providing check-points for the signee 410 to authenticate their identity and the presence of the signable object 420.

Figure 5:
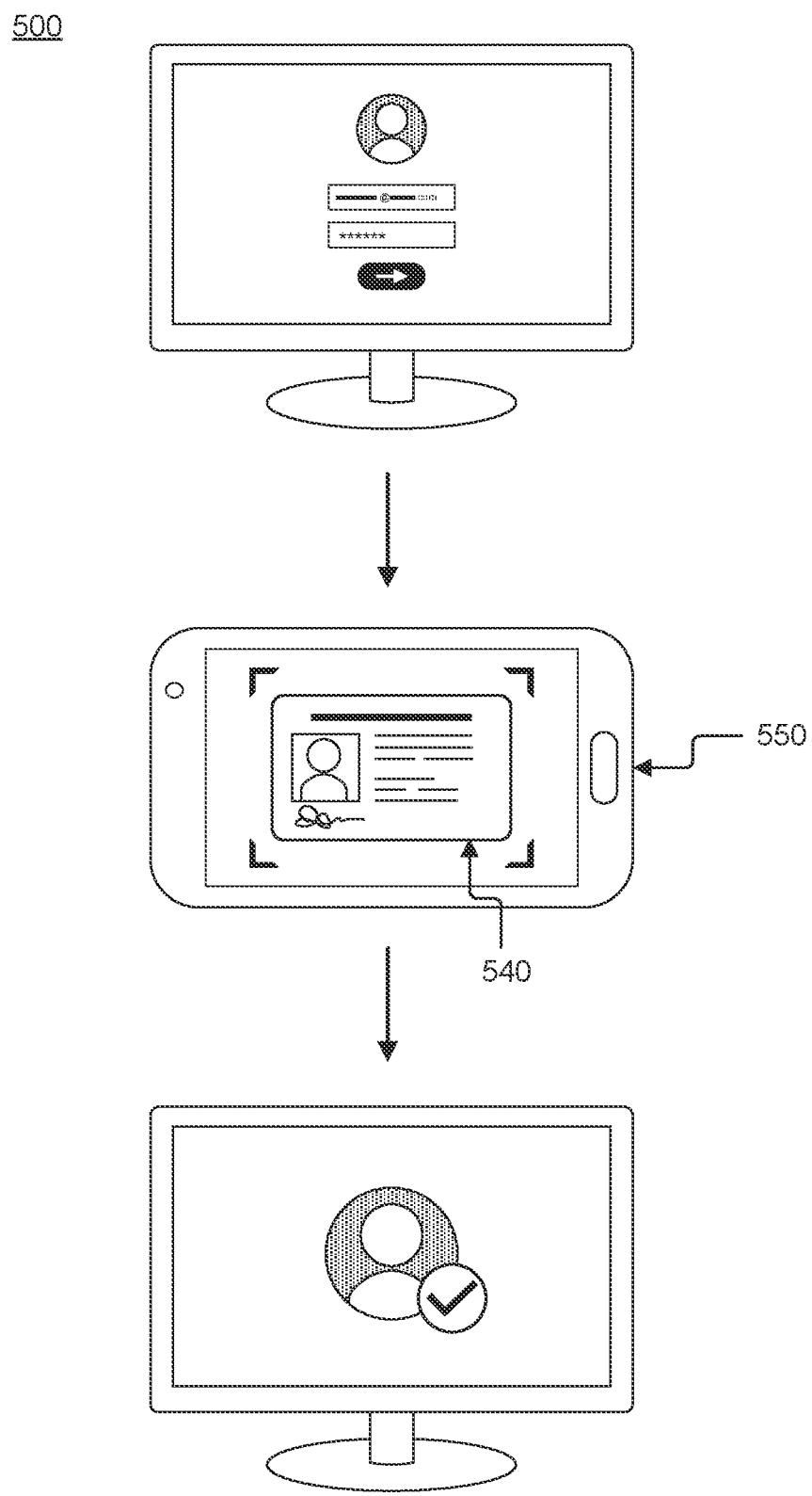
FIG. 5 illustrates an exemplary signature verification, according to some embodiments of the present disclosure.

Referring now to FIG. 5, an exemplary signature verification 500 is illustrated. In some embodiments, the signature verification 500 may utilize an external device 550, such as a computer with a desktop application. The desktop application may comprise a plurality of interfaces, such as a login interface, a photo identification upload and verification interface, and a confirmation interface, as non-limiting examples. In some aspects, a verifying document 540 may comprise photo identification that may be compared to personal signee information to verify the signee.

In some implementations, the signature verification 500 may store a user's data, such as a driver's license or other form of identification, for multiple verification cycles. In other implementations, the user may have to re-upload a driver's license or some other form of photo identification in order to utilize the signature verification 500. These methods may allow for reuse of the signature verification 500 for authentication of later signatures. Due to the previously verified nature of the identification and its stored on an immutable virtual server, the stored identification may decrease the required time for the signature verification 500 process.

Figure 6:
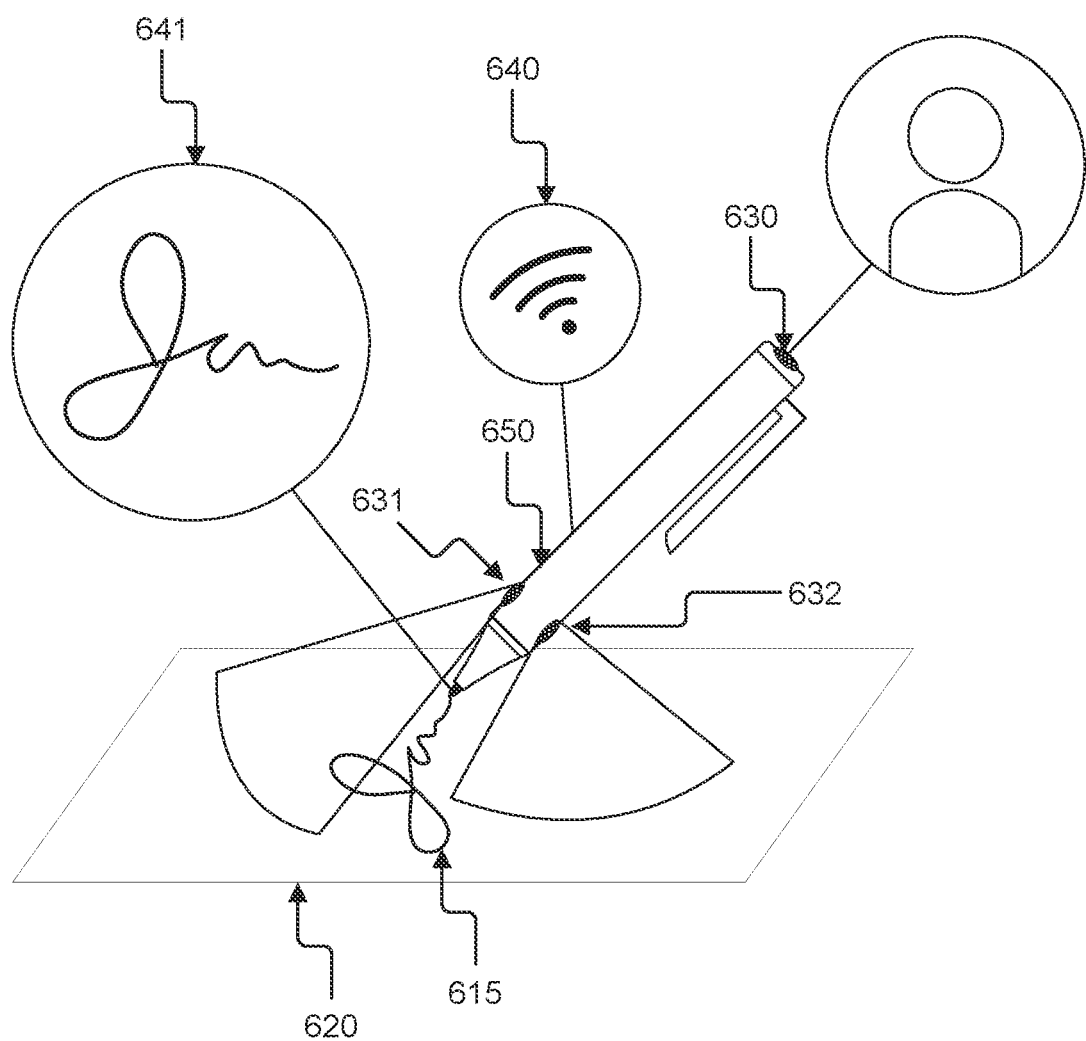
FIG. 6 illustrates an exemplary signature verification comprising an external device, according to some embodiments of the present disclosure.

Referring now to FIG. 6, an exemplary signature verification 600 comprising an external device 650 is illustrated. The external device 650 may comprise a plurality of visual capture devices 630, 631, 632. In some embodiments, the visual capture device 630 may capture an image or video of the signee as they sign the signable object 620. In some implementations, the visual capture devices 631, 632 may work selectively, individually, or in tandem, or some combination thereof, to capture an image or video of the signature 615.

In some aspects, the external device 650 may comprise a plurality of external transmitters 640, such as a Wi-Fi radio, a Bluetooth radio, a GPS radio, and other non-limiting equivalents. For example, the plurality of transmitters may comprise metadata such as a date and timestamp which may be uploaded to the blockchain along with the visual data captured by the plurality of visual capture devices 630, 631, 632.

In some embodiments, the external device 650 may comprise one or more auxiliary authentications 641 to enable the external device 650 to measure and record a plurality of measurements, such as the amount of pressure the signee exerts on the external device 650 when writing the signature 615. The plurality of metadata capture devices may also record the speed of the signature 615 using an accelerometer. In some implementations, these auxiliary authentications 641 may be stored on the blockchain for later authentication of the signature verification 600. For example, the auxiliary authentications 641 may capture data that is extremely difficult to forge, such as the amount of pressure a signee uses when they sign parts of or the entirety of their name.

Figure 7:
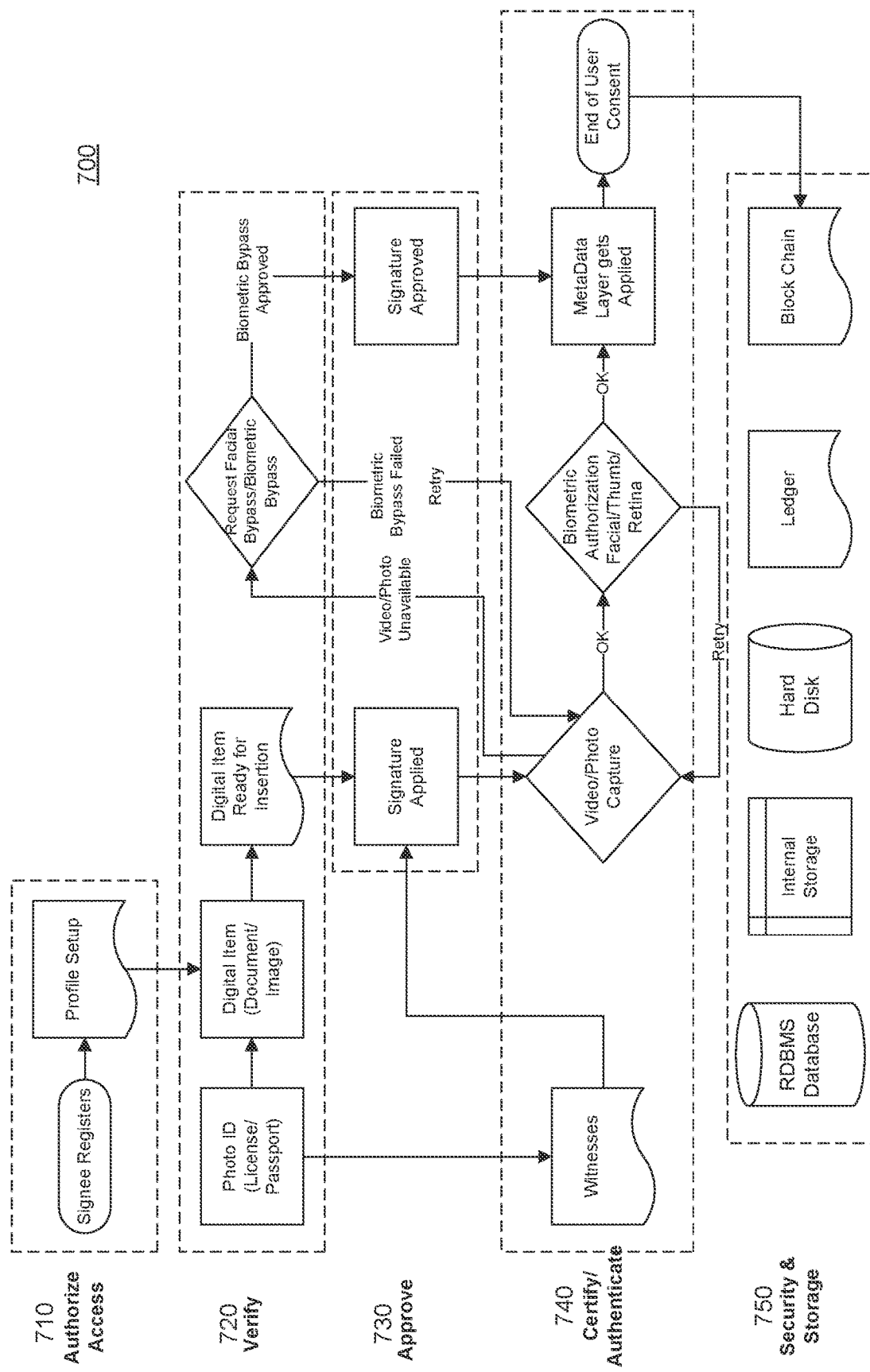
FIG. 7 illustrates a method for storing an exemplary signature verification, according to some embodiments of the present disclosure.

Referring now to FIG. 7, an exemplary process flow 700 for authenticating and storing signature verification is illustrated. At 710, initial access and verification may be authorized by a signee when the signee registers and sets up a profile. At 720, identity of the signee may be verified through a range of mechanisms, such as through a license or other photo identification, fingerprint, or facial recognition based on the license or other photo identification. At 730, a signature may be applied to a signable object and approved.

At 740, the signee may be authenticated, such as through witnesses, video capture, biometrics, and metadata, as non-limiting examples. In some embodiments, independent witnesses may further authenticate a signing of a signable object. Where witnesses may be separately verified and authenticated, witnesses may be considered a signee for their portion of the signable object, such as on the witness line. The system may separately capture witness identification and video to add an additional layer of authentication to the signed signable object. At 750, the signature and authentication information may be stored securely. In some embodiments, the storage may occur on an immutable database, such as blockchain.

Figure 8A:
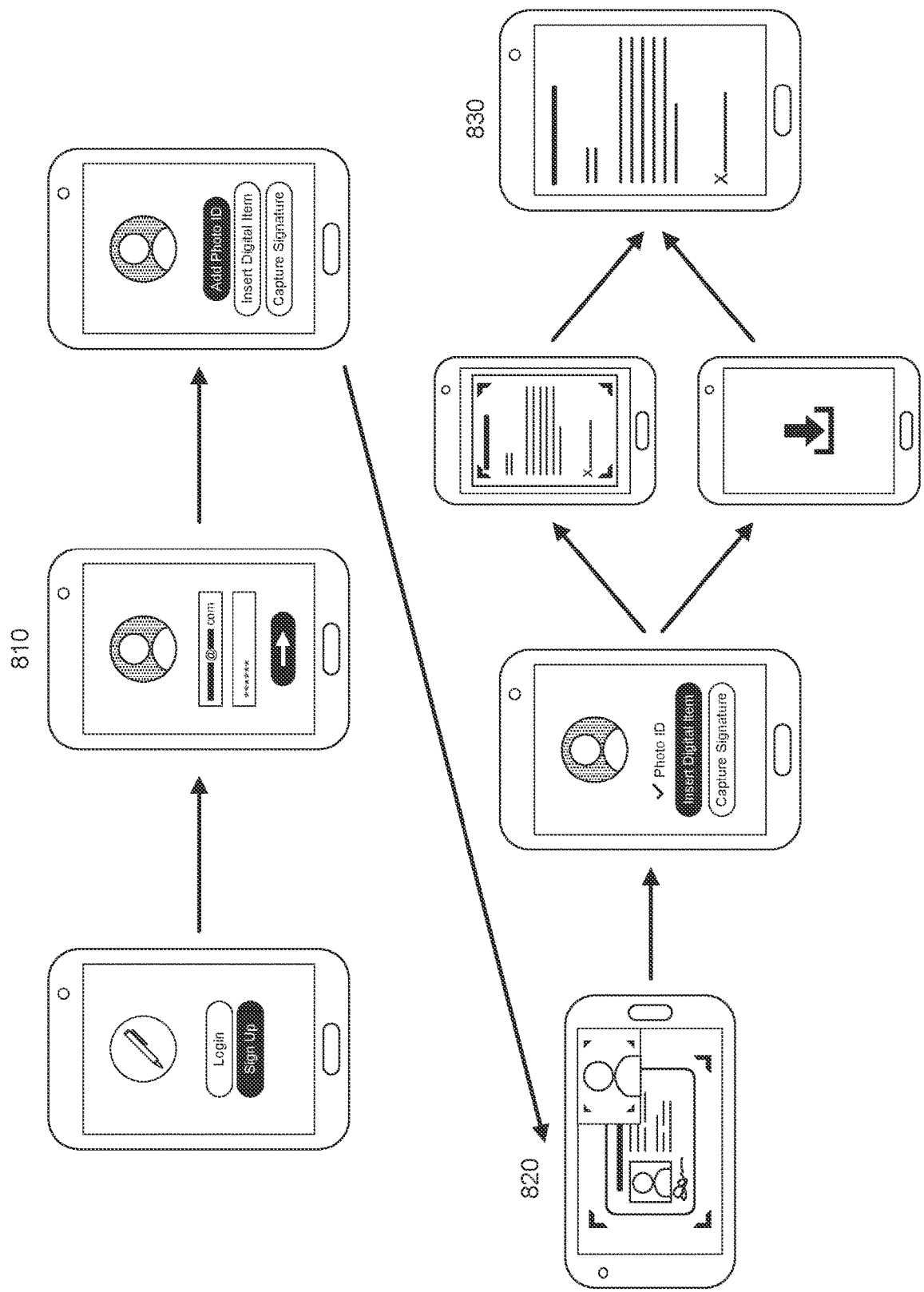
FIG. 8A illustrates a method for storing an exemplary signature verification, according to some embodiments of the present disclosure.
Figure 8B:
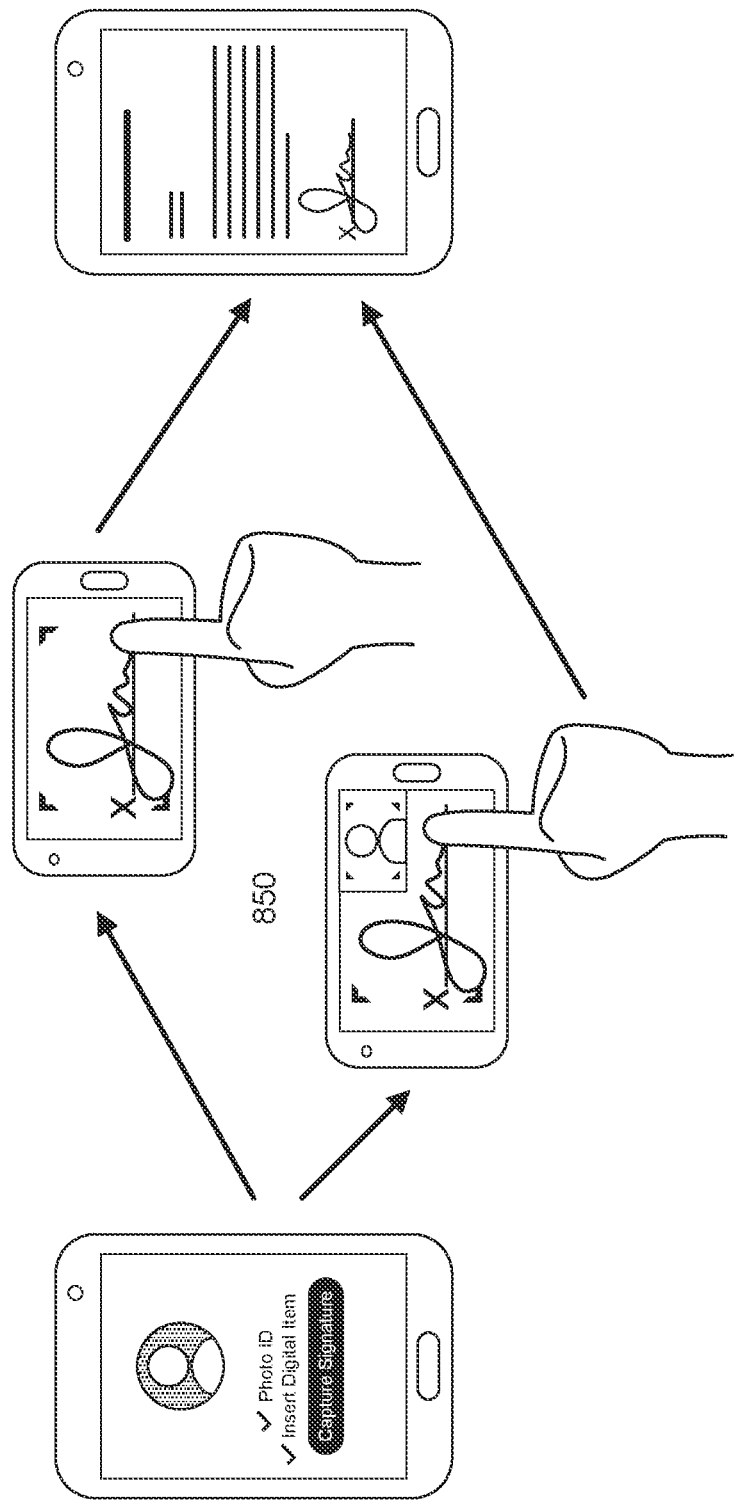
FIG. 8B illustrates a method for storing an exemplary signature verification, according to some embodiments of the present disclosure.
Figure 8C:
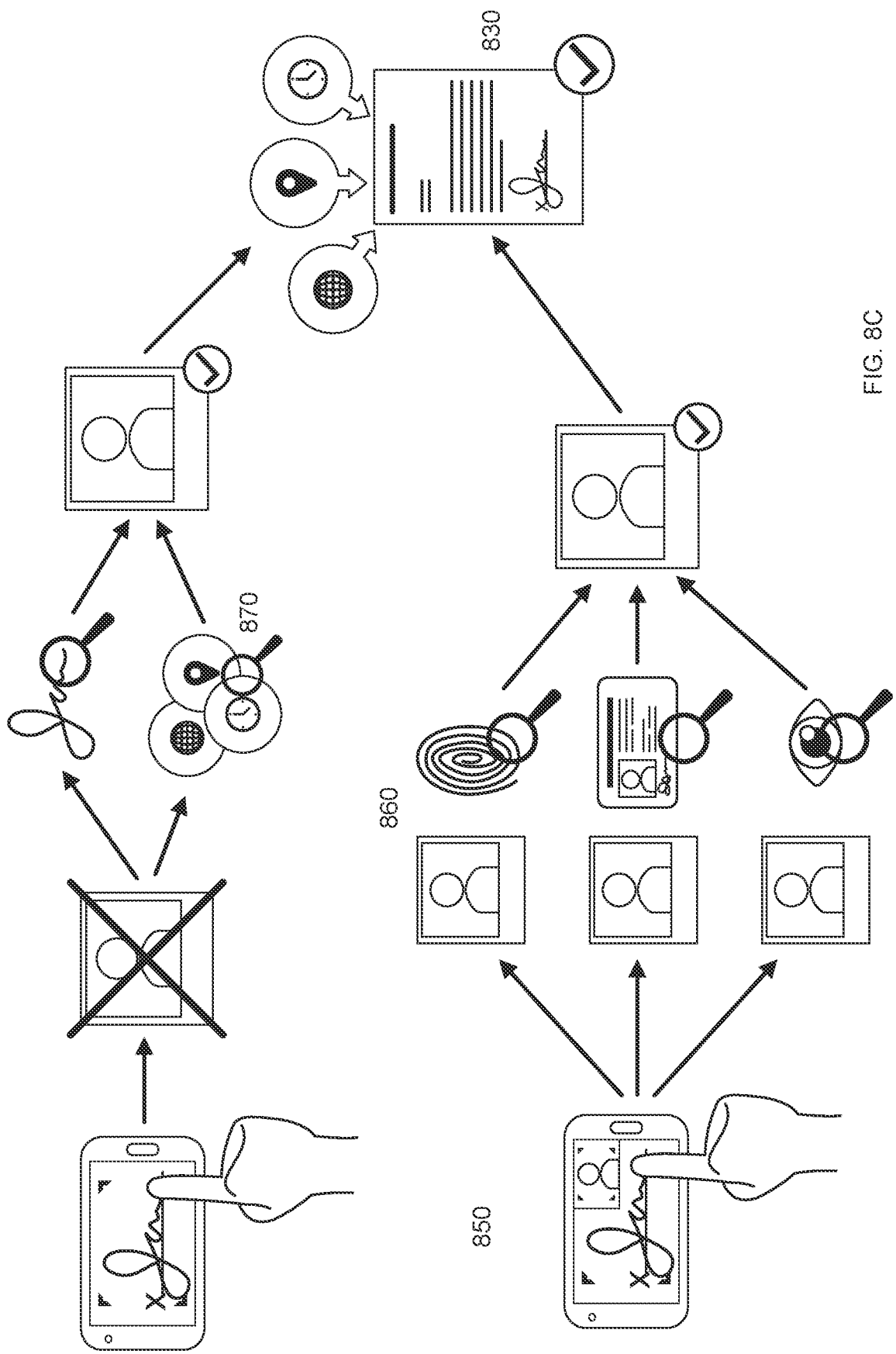
FIG. 8C illustrates a method for storing an exemplary signature verification, according to some embodiments of the present disclosure.

Referring now to FIGS. 8A-8C, exemplary process steps for authenticating and verifying a signature are illustrated. In some aspects, a signee may login or sign up for an account profile 810. In some embodiments, the signee may upload a photo identification 820 as a way to verify that they are who they claim to be. In some implementations, a signee may access, capture, or download a signable object 830.

In some aspects, signature capture 850 may occur concurrently with video capture to confirm the identity of the signee in real time and contemporaneously with the act of signing. In some implementations, signature capture 850 may occur with biometric authentication 860. In some embodiments, signature capture may integrate metadata 870. Where video may not be available or in combination with biometric authentication 860, the signature may be independently authenticated such as through a comparison with previously authenticated signatures and a comparison of collected metadata 870 to known facts related to the signing and the signee. In some embodiments, video or image capture may allow for biometric authentication 860, such as through retina scan, fingerprinting, or facial recognition, as non-limiting examples. A fully executed signable object 830 may be securely stored in an immutable database.

Figure 9:
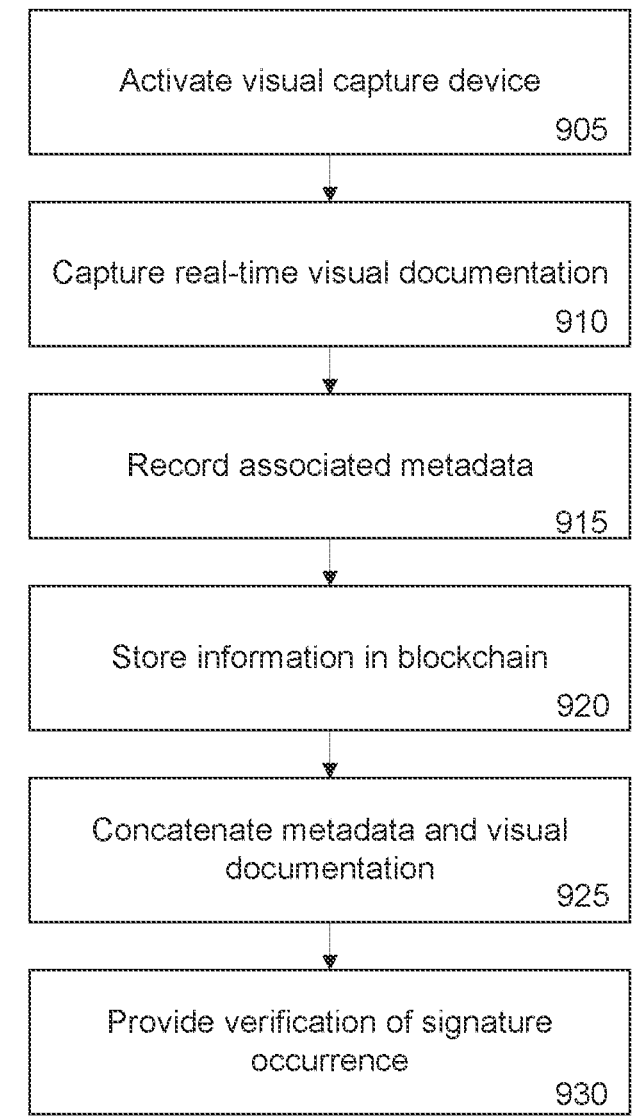
FIG. 9 illustrates an exemplary method for signature verification, according to some embodiments of the present disclosure.

Referring now to FIG. 9, exemplary method steps 900 for a signature verification are illustrated. In some embodiments, at 905, the signature verification may activate one or more visual capture devices. In some implementations, the visual capture device may record video. In some aspects, the visual capture device may take real-time pictures. Once the visual capture device is activated, at 910, the visual capture device may capture real-time visual documentation, of the signature verification.

In some embodiments, the signature verification may record metadata associated with the occurrence of the signature and its corresponding visual documentation. For example, the metadata may comprise the geolocation, date, and time the signature was visually documented for provide additional information to verify the signature.

At 915, the signature verification may record the associated metadata, and in some aspects, may form an association between the metadata and the visual documentation. Once the metadata and visual documentation has been recorded, at 920, the metadata and the visual documentation may be stored in the blockchain. In some embodiments, the blockchain may comprise an associative database, a ledger, or a decentralized database or ledger, as non-limiting examples.

At 925, the information stored in the blockchain may be concatenated to increase the validity of the signature verification. For example, the signature verification may associate the date, time, known IP address, and geolocation with a video of the signature to verify the occurrence of the signature. At 930, the metadata and visual documentation may provide verification of the signature occurrence.

Figure 10:
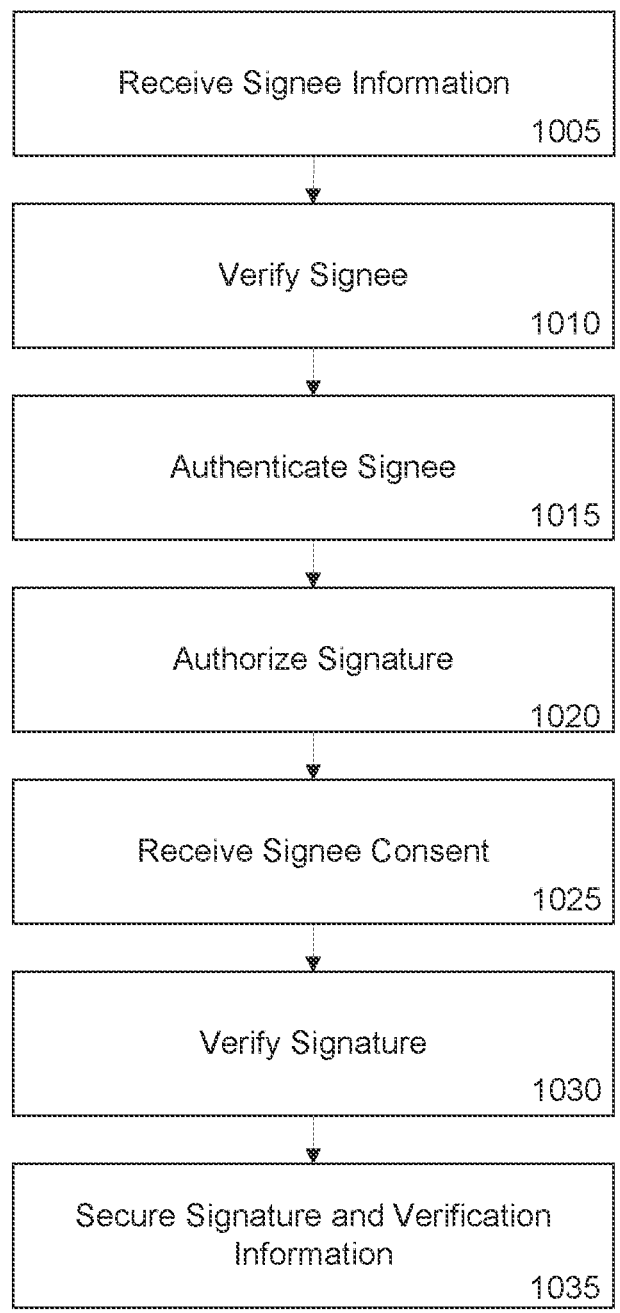
FIG. 10 illustrates an exemplary method for authenticating and verifying a signature, according to some embodiments of the present disclosure.

Referring now to FIG. 10, exemplary method steps 1000 for authenticating and verifying a signature are illustrated. At 1005, signee information may be received, such as a name and other identifying information. At 1010, a signee may be verified, such as through a photo identification. At 1015, a signee executing a signable object may be authenticated in real time, such as through video capture, image capture, or biometrics, as non-limiting examples. At 1020, a signature may be authorized. At 1025, user consent may be received. At 1030, a signature may be verified, such as through a comparison of metadata to known data about the signee. At 1035, signature and verification information may be secured, such as through storage on an immutable database.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A system for signature verification, comprising:
    a signable object, configured to be signed by a signee;
    at least one external device, wherein the at least one external device comprises:
        a first visual capture device and a second visual capture device, wherein the first visual capture device is configured to visually capture at least one of: a signature of the signee on the signable object and one or more portions of at least one verifying document and the second visual capture device is configured to visually capture one or more portions of a face of the signee, wherein the first visual capture device is oriented in a first direction and the second visual capture device is oriented in a second direction, wherein the first direction is different from the second direction; and
        at least one metadata capture device configured to provide at least one auxiliary authentication, wherein the at least one auxiliary authentication provides secondary documentation of signing the signable object, wherein the at least one metadata capture device comprises at least one of: a pressure sensor configured to measure an amount of force exerted on the at least one external device when the signable object is signed by the signee and an accelerometer configured to measure a speed with which the signee signs the signable object;
    virtual data comprising information received from the first visual capture device and the second visual capture device, wherein the virtual data further comprises a plurality of metadata, wherein the metadata comprises information received from the at least one metadata capture device; and
    a virtual database configured to record the virtual data, wherein the virtual data is stored within the virtual database in a decentralized array,
    wherein the at least one external device is configured to detect a location of the signable object and a location of the signee using the first visual capture device and the second visual capture device, wherein the at least one external device is further configured to selectively activate the first visual capture device and the second visual capture device based on the detected locations of the signable object and the signee,
    wherein the at least one external device comprises a writing instrument, wherein the at least one external device further comprises a third visual capture device oriented in a third direction, wherein the third direction is different from the first direction and the second direction, wherein the at least one external device is further configured to determine the location of the signable object using the first visual capture device and the third visual capture device, wherein the at least one external device is further configured to selectively activate the first visual capture device and the third visual capture device based on the detected location of the signable object,
    wherein the at least one external device is further configured to determine a location of at least one verifying document using the first visual capture device and the third visual capture device, wherein the at least one external device is further configured to selectively activate the first visual capture device and the third visual capture device based on the detected location of the at least one verifying document,
    wherein each of the first visual capture device, the second visual capture device, and the third visual capture device comprises one or more cameras.

2. The system of claim 1, wherein the signable object comprises a tangible or digital form, file, or piece that can be affixed with the signee's signature.

3. The system of claim 1, wherein the at least one external device interfaces with a virtual application.

4. The system of claim 3, wherein the at least one external device interfaces with the virtual database via the virtual application to upload the virtual data.

5. The system of claim 3, wherein the at least one external device interfaces with the virtual database via the virtual application to retrieve the virtual data.

6. The system of claim 1, wherein the at least one external device further comprises one or more of a Wi-Fi transmitter, a Bluetooth transmitter, RFID transmission, or a GPS transmitter.

7. The system of claim 1, wherein the at least one external device digitizes the signable object.

8. The system of claim 1, wherein the metadata is derived from one or more of a calendar, a clock, a coordinate system, an accelerometer, a GPS, or pressure sensor.

9. The system of claim 1, wherein the metadata comprises two or more of visual data, audio data, geospatial data, a date and timestamp, or an IP address.

10. The system of claim 1, wherein the virtual database comprises a virtual ledger.

\* \* \* \* \*